United States Patent
Lyons et al.

(10) Patent No.: US 9,102,814 B2
(45) Date of Patent: Aug. 11, 2015

(54) POLYHYDROXY CURABLE FLUOROELASTOMER COMPOSITIONS

(71) Applicant: E I DU PONT DE NEMOURS AND COMPANY, Wilmington, DE (US)

(72) Inventors: Donald F Lyons, Wilmington, DE (US); Peter A Morken, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 122 days.

(21) Appl. No.: 13/676,586

(22) Filed: Nov. 14, 2012

(65) Prior Publication Data

US 2013/0158197 A1    Jun. 20, 2013

Related U.S. Application Data

(60) Provisional application No. 61/570,873, filed on Dec. 15, 2011.

(51) Int. Cl.

| | |
|---|---|
| *C08K 5/13* | (2006.01) |
| *C08L 27/12* | (2006.01) |
| *C08L 27/22* | (2006.01) |
| *C08K 5/5425* | (2006.01) |
| *C08K 5/54* | (2006.01) |
| *C08K 5/56* | (2006.01) |
| *C08L 27/16* | (2006.01) |
| *C08L 43/04* | (2006.01) |
| *C08L 83/06* | (2006.01) |
| *C08K 5/57* | (2006.01) |

(52) U.S. Cl.
CPC .............. *C08K 5/5425* (2013.01); *C08K 5/13* (2013.01); *C08K 5/5403* (2013.01); *C08K 5/56* (2013.01); *C08L 27/12* (2013.01); *C08L 27/16* (2013.01); *C08L 27/22* (2013.01); *C08L 43/04* (2013.01); *C08L 83/06* (2013.01); *C08K 5/57* (2013.01); *C08L 2312/08* (2013.01)

(58) Field of Classification Search
CPC ......... C08L 43/04; C08L 83/06; C08L 27/12; C08L 27/22; C08L 2312/08; C08K 5/13; C08K 5/5403; C08K 5/5425; C08K 5/56; C08K 5/57
USPC ................. 525/100, 104, 185, 274, 288, 298, 525/326.3
See application file for complete search history.

(56) References Cited

U.S. PATENT DOCUMENTS

| | | |
|---|---|---|
| 3,876,654 A | 4/1975 | Pattison et al. |
| 4,250,278 A | 2/1981 | Furukawa et al. |
| 4,259,463 A | 3/1981 | Moggi et al. |
| 4,882,390 A | 11/1989 | Kolb et al. |
| 4,912,171 A | 3/1990 | Grootaert et al. |
| 4,957,975 A | 9/1990 | Carlson et al. |
| 5,591,804 A | 1/1997 | Coggio et al. |
| 5,648,429 A | 7/1997 | Chiodini et al. |
| 6,916,871 B2 | 7/2005 | Hare et al. |
| 2002/0169242 A1 * | 11/2002 | Kawazura .................... 524/261 |

FOREIGN PATENT DOCUMENTS

| | | |
|---|---|---|
| JP | 09268245 A1 * | 10/1997 |
| WO | 0244264 A2 | 6/2002 |
| WO | 03104323 A1 | 12/2003 |
| WO | 2006007244 A1 | 1/2006 |

OTHER PUBLICATIONS

Corresponding case PCT/US2012/069597, International Search Report, European Patent Office, Rijswijk, NL Authorized Officer Enrique de Los Acros, Mar. 12, 2013.

Liu, Jianqiang et al "Fluororubber formula for rubber board," XP002693631, retrieved from CA Online Chemical Abstracts Service, Columbus, OH STN Database Accession No. 2012:936759 Abstract and CN102516690A (Qingdad TKS Sealing Industry Co., Ltd, Peop. Rep. China) Jun. 27, 2012.

Nishimoto, Kazuo et al "Melt-moldable fluoresin compositions with good resiliency, tensile properties and heat resistance, and manufacture thereof and molding therefrom," XP002693632, retrieved from CA Online Chemical Abstracts Service, Columbus, OH STN Database Accession No. 1997:681930 Astract & JP9268245A (Nicohias Corp., Japan Oct. 14, 1997.

Sands, Michael Benjamin et al "Thermal characterization of the interaction of a silane adhesive and dihydroxy vulcanized fluorelastomers," Fall 168th Technical Meeting of the Rubber Division, American Chemical Society, Pittsburgh, PA, No. Paper 36, Jan. 1, 2005, pp. 1-37, XP008160672, ISSN: 1547-1977 Experimental; Figures 13, 14; Tables 2,9.

* cited by examiner

*Primary Examiner* — Irina S Zemel
*Assistant Examiner* — Jeffrey Lenihan

(57) ABSTRACT

Disclosed herein is a curable composition comprising a polyhydroxy curable fluoroelastomer, a polyhydroxy curative, a cure accelerator and an unsaturated metal compound process aid comprising a siloxane having at least one vinyl or allyl group bonded to a silicon atom. Such curable compositions have a lower Mooney viscosity than do similar compositions absent the process aid.

6 Claims, No Drawings

POLYHYDROXY CURABLE FLUOROELASTOMER COMPOSITIONS

CROSS-REFERENCE TO RELATED APPLICATIONS

This application claims the benefit of U.S. Provisional Application No. 61/570,873 filed Dec. 15, 2011.

FIELD OF THE INVENTION

This invention relates to polyhydroxy curable fluoroelastomer compositions comprising i) a fluoroelastomer, ii) a polyhydroxy curative, iii) a cure accelerator and iv) an unsaturated metal compound process aid.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro(methyl vinyl ether), perfluoro(ethyl vinyl ether) and perfluoro(propyl vinyl ether).

In order to fully develop physical properties such as tensile strength, elongation, and compression set, elastomers must be cured, i.e. vulcanized or crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly employed curing agents for fluoroelastomers include difunctional nucleophilic reactants, such as polyhydroxy compounds.

Prior to curing, fluoroelastomers are typically compounded with other ingredients (e.g. fillers, colorants, etc.) and shaped (e.g. molded or extruded) into various articles such as seals, o-rings, gaskets and hose. Fluoroelastomer compositions may have a Mooney viscosity that is too high to mix or shape easily. Thus, it would be desirable to have means to lower the Mooney viscosity of fluoroelastomer compositions.

SUMMARY OF THE INVENTION

In one aspect, the present invention provides a curable fluoroelastomer composition comprising:

A) a polyhydroxy curable fluoroelastomer;
B) a polyhydroxy curative;
C) a cure accelerator; and
D) an unsaturated metal compound process aid comprising a siloxane having at least one vinyl or allyl group bonded to a silicon atom.

DETAILED DESCRIPTION OF THE INVENTION

The present invention is directed to polyhydroxy curable fluoroelastomer compositions that contain an unsaturated metal compound process aid. Such fluoroelastomer compositions have a lower Mooney viscosity than do similar compositions absent the process aid.

Fluoroelastomers that are suitable for use in this invention are those that are polyhydroxy curable. By "polyhydroxy curable" is meant fluoroelastomers which are known to crosslink with polyhydroxy curatives such as bisphenol AF. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride ($VF_2$) and hexafluoropropylene (HFP) as well as fluoroelastomers which contain adjacent copolymerized units of $VF_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro (methyl vinyl ether) and 3,3,3-trifluoropropylene.

In addition to the fluoroelastomer, curable compositions of this invention contain a polyhydroxy cure system, meaning a polyhydroxy curative and a vulcanization (or curing) accelerator.

The curable compositions contain 0.4 to 4 parts by weight (preferably 1 to 2.5 parts) of polyhydroxy curing agent (or a derivative thereof) per 100 parts by weight fluoroelastomer, i.e. 0.4-4 phr (preferably 1-2.5 phr). Typical polyhydroxy cross-linking agents include di-, tri-, and tetrahydroxybenzenes, naphthalenes, and anthracenes, and bisphenols of the formula

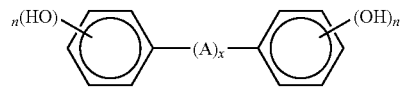

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxy-benzene) (i.e. bisphenol AF or BPAF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

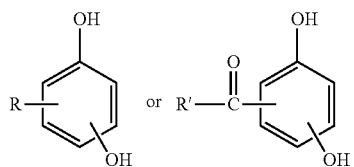

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$-$R_4$ are $C_1$-$C_8$ alkyl groups and at least three of $R_1$-$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenyl, and the diacetate of hydroquinone.

Vulcanization accelerators (also referred to as cure accelerators) which may be used in the curable fluoroelastomer compositions include tertiary sulfonium salts such as $[(C_6H_5)_2S^+(C_6H_{13})][Cl]^-$, and $[(C_6H_{13})_2S(C_6H_5)]^+[CH_3CO_2]^-$ and quaternary ammonium, phosphonium, arsonium, and stibonium salts of the formula $R_5R_6R_7R_8Y^+X^-$, where Y is phosphorous, nitrogen, arsenic, or antimony; $R_5$, $R_6$, $R_7$, and $R_8$ are individually $C_1$-$C_{20}$ alkyl, aryl, aralkyl, alkenyl, and the chlorine, fluorine, bromine, cyano, —OR, and —COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltriphenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino)phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenyl-phosphonium chloride, tetrabutylphosphonium bromide, m-trifluoromethylbenzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.05 and 2 parts by weight per hundred parts by weight fluoroelastomer (0.05-2 phr). Preferably, 0.1 to 1.0 parts accelerator per hundred parts fluoroelastomer is used.

The curable compositions of the invention also contain between 0.1 and 4 (preferably 0.3 to 2) parts by weight of at least one unsaturated metal compound process aid per 100 parts fluoroelastomer.

The process aid is a siloxane having at least one unsaturated group X defined as vinyl group $CR^1$=$CR^2R^3$ or allyl group $CR^1R^2CR^3$=$CR^4R^5$ bonded to a silicon atom, where $R^1$-$R^5$ are selected independently from the group consisting of H, F, alkyl, aryl, heterocycle, or perfluoroalkyl groups. The $R^1$-$R^5$ group may be a mixed alkyl and perfluoroalkyl group such as $CF_3(CF_2)_5CH_2CH_2$—. It is preferred that the $R^1$-$R^5$ groups be H or F and most preferably H. Introduction of an excess of non-hydrogen R groups on the unsaturated X group can be detrimental to performance due to steric hindrance. However introduction of 1, 2 or 3 non-hydrogen groups can in some instances improve performance. Preferably, the vinyl or allyl groups will be an —OSiX, where X=vinyl or allyl, whereby the vinyl or allyl group is attached to a silicon atom that is further bonded to an oxygen atom. The siloxane may be a simple low molecular weight organic compound or may be a polymeric compound including for example a polysiloxane which may be linear, branched or cyclic.

Examples of low molecular weight siloxanes include for example alkoxy silanes corresponding to the formula $(R^a)_s(R^bO)_tSiX_w$ wherein each $R^a$ independently represents an alkyl group such as for example methyl or ethyl or another lower alkyl ($C_1$-$C_7$ alkyl group) or an alkyl group substituted with a substituent such as for example an aryl group, halide such as fluorine, an ester, an alkoxy, etc., or aryl group optionally substituted such as for example with an alkyl group, an ester, an alkoxy, etc.; each $R^b$ independently represents an alkyl group, preferably a lower alkyl group which may optionally be substituted, or aryl group, X is a vinyl or allyl group, and t and w represent an integer of at least 1 and the sum of s+t+w being 4. Examples of siloxanes according to the above formula include vinyldiphenylethoxysilane (CAS #17933-85-6), allyltrimethoxysilane (CAS #2551-83-9), and vinyltriphenoxysilane (CAS #18666-65-4).

The siloxane process aid may also be a polysiloxane (oligomer or polymer), comprising a polysiloxy backbone. Such polymer or oligomer may be terminated by a group containing one or more allyl or vinyl siloxane functions and/or may contain allyl or vinyl siloxane groups distributed along the backbone.

For example, the polysiloxanes for use with this invention include those that correspond to the formula:

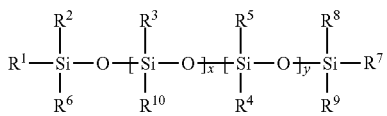

wherein $R^1$, $R^2$, $R^3$, $R^6$, $R^7$, $R^8$ and $R^9$ each independently represents an alkoxy group, an alkyl optionally substituted such as for example with an aryl group, halide such as fluorine, an ester, an alkoxy etc., or aryl group optionally substituted such as for example with an alkyl group, an ester, an alkoxy etc., vinyl group, allyl group, $R^4$ and $R^5$ each independently represents an alkoxy group, an alkyl or aryl group each of which may optionally be substituted, $R^{10}$ is a vinyl or allyl group, x represents a value of 0 to 150, y represents a value of 0 to 150 and with the proviso that when x=0, at least one of $R^1$, $R^2$, $R^3$, $R^6$, $R^7$, $R^8$ and $R^9$ represents a vinyl or allyl group. The polysiloxane may be a co-polymer or terpolymer comprised of two or more different types of —Si($R^4$)($R^5$)O— repeating units. The ratio of the sum of the number of vinyl and allyl groups in each polysiloxane molecule to the number of silicon atoms in the polysiloxane molecule is 0.01 to 3, preferably 0.05 to 2, or more preferably 0.1 to 1.

Specific examples of polysiloxanes include 1,5-divinyl-3,3-diphenyl-1,1,5,5-tetramethyltrisiloxane (CAS #18586-22-6), 1,3-divinyl-1,3-diphenyl-1,3-dimethyldisiloxane (CAS #2627-97-6), 1,5-divinylhexamethyltrisiloxane (CAS #136777-27-0), 1,3-divinyltetraphenyldisiloxane (CAS #18769-05-6), vinyl terminated polydimethylsiloxanes, vinyl terminated diphenylsiloxane-dimethylsiloxane copolymers, and vinylmethylsiloxane homopolymers, available from Gelest Corp., Morrisville, Pa.

Further siloxanes that can be used include cyclic siloxanes which contain vinyl or allyl groups attached to the silicon atom.

Without being bound by theory, the reduction in viscosity is believed to be caused by association of polar polymer end groups such as carboxylic or sulfonic acids or their salts with the unsaturated metal compound process aid forming a species that has weaker ionic interchain associations and thus lower viscosity.

Other ingredients (e.g. fillers, colorants, process aids, acid acceptors, etc.) commonly employed in elastomer compositions may also be included in the curable compositions of the invention.

The fluoroelastomer, polyhydroxy curative, cure accelerator, unsaturated metal compound process aid and any other ingredients are generally incorporated into a curable composition by means of an internal mixer or rubber mill. The resulting composition may then be shaped (e.g. molded or extruded) and cured to form a fluororubber article. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded fluororubber article is heated in an oven or the like for an additional period of about 1-48 hours, typically from about 180°-275° C., generally in an air atmosphere.

EXAMPLES

Test Methods

Mooney viscosity was determined according to ASTM D-1646, large rotor, condition ML 1+10 minutes, measured at 121° C.

Cure characteristics were measured using a Monsanto Moving Die Rheometer (MDR 2000) instrument under the following conditions:
Moving die frequency: 1.66 Hz
Oscillation amplitude: 0.5
Temperature: 177° C. unless otherwise indicated
Duration of test: 24 minutes
The following cure parameters were recorded:
$M_H$: maximum torque level, in units of dN·m
$M_L$: minimum torque level, in units of dN·m
$t_s2$: minutes to 2 units rise above $M_L$
t50: minutes to 50% of maximum torque
t90: minutes to 90% of maximum torque
Tensile properties were determined by ASTM D412.
Compression set resistance was measured according to ASTM D395.

The invention is further illustrated by, but is not limited to, the following examples.

Fluoroelastomer (FKM1) employed in the examples was Viton® VTR-7241, a copolymer of vinylidene fluoride, hexafluoropropylene, and tetrafluoroethylene, available from DuPont.

Example 1 and Comparative Example A

Curable compositions for Example 1 and Comparative Example A were made by compounding the ingredients on a two-roll mill. Formulations are shown in Table I. Mooney viscosity of the compositions is also shown in Table I. Mooney viscosity was reduced 9.9% by the siloxane of this Invention.

TABLE I

| Ingredient, phr[1] | Comp. Ex. A | Example 1 |
|---|---|---|
| FKM1 | 100 | 100 |
| Ca(OH)$_2$ | 6 | 6 |
| MgO[2] | 3 | 3 |
| 1,5-divinyl-3,3-diphenyl-1,1,5,5-tetramethyltrisiloxane | 0 | 1 |
| Carbon black N990 | 30 | 30 |
| VC50[3] | 2.5 | 2.5 |
| Mooney viscosity, ML(1 + 10) @121° C. | 117.1 | 105.5 |
| Curing Characteristics (190° C./30 min.) | | |
| ML, dNm | 1.24 | 1.18 |
| MH, dNm | 17.02 | 17.57 |
| ts2, minutes | 2.71 | 3.48 |
| t50, minutes | 3.4 | 4.86 |
| t90, minutes | 4.56 | 6.98 |
| Compression set, 25% Deflection | | |
| Compression Set 200° C., 70 h, % | 36 | 34 |

TABLE I-continued

| Ingredient, phr[1] | Comp. Ex. A | Example 1 |
|---|---|---|
| Physical Properties | | |
| Hardness, Shore A | 71 | 75 |
| M50, MPa | 2.12 | 2.41 |
| M100, MPa | 3.76 | 4.16 |
| M200, MPa | 9.14 | 8.68 |
| Tb, MPa | 12.96 | 11.68 |
| Eb (%) | 269 | 273 |
| Tensile (20°) Hot Air Aged 70 h/275° C. | | |
| Hardness, % retention | 101% | 100% |
| M50, % retention | 86% | 87% |
| M100, % retention | 70% | 67% |
| M200, % retention | 54% | 57% |
| Tb, % retention | 71% | 64% |
| Eb, % retention | 137% | 146% |

[1]parts by weight per hundred parts rubber (i.e. fluoroelastomer)
[2]Elastomag 170, (available from Akrochem Corp.)
[3]a mixture of bisphenol AF and a quaternary phosphonium salt (available from DuPont)

What is claimed is:

1. A curable fluoroelastomer composition comprising:
A) a polyhydroxy curable fluoroelastomer;
B) a polyhydroxy curative;
C) a cure accelerator; and
D) an unsaturated metal compound process aid comprising a siloxane having at least one vinyl or allyl group bonded to a silicon atom, wherein said unsaturated metal compound process aid is:
1,5-divinyl-3,3-diphenyl-1,1,5,5-tetramethyltrisiloxane,
1,3-divinyl-1,3-diphenyl-1,3-dimethyldisiloxane,
1,5-divinylhexamethyltrisiloxane,
1,3-divinyltetraphenyldisiloxane, or
vinyl terminated diphenylsiloxane-dimethylsiloxane copolymer.

2. The curable composition of claim 1 wherein said unsaturated metal compound process aid is 1,5-divinyl-3,3-diphenyl-1,1,5,5-tetramethyltrisiloxane.

3. The curable composition of claim 1 wherein said unsaturated metal compound process aid is 1,3-divinyl-1,3-diphenyl-1,3-dimethyldisiloxane.

4. The curable composition of claim 1 wherein said unsaturated metal compound process aid is 1,5-divinylhexamethyltrisiloxane.

5. The curable composition of claim 1 wherein said unsaturated metal compound process aid is 1,3-divinyltetraphenyldisiloxane.

6. The curable composition of claim 1 wherein said unsaturated metal compound process aid is vinyl terminated diphenylsiloxane-dimethylsiloxane copolymer.

* * * * *